(12) United States Patent
Kob

(10) Patent No.: US 9,387,591 B2
(45) Date of Patent: Jul. 12, 2016

(54) PLIERS

(71) Applicant: FIPA GmbH, Ismaning (DE)

(72) Inventor: Roland Kob, Erding (DE)

(73) Assignee: FIPA GmbH, Ismaning (DE)

(*) Notice: Subject to any disclaimer, the term of this patent is extended or adjusted under 35 U.S.C. 154(b) by 0 days.

(21) Appl. No.: 14/741,170

(22) Filed: Jun. 16, 2015

(65) Prior Publication Data

US 2015/0375403 A1 Dec. 31, 2015

(30) Foreign Application Priority Data

Jun. 18, 2014 (DE) .......................... 10 2014 211 772

(51) Int. Cl.
*B66C 1/00* (2006.01)
*B66C 1/42* (2006.01)
*B25J 15/00* (2006.01)
*B25J 13/08* (2006.01)

(52) U.S. Cl.
CPC ............ *B25J 15/0028* (2013.01); *B25J 13/082* (2013.01)

(58) Field of Classification Search
CPC ...... B25J 15/0028; B25J 19/02; B25J 15/086; B25J 15/0273; B25J 15/0009; B25J 15/00; B25J 13/082; B25J 15/103; B25J 15/0206; G01D 5/2006; B25B 7/02; B25B 9/00; B66C 1/48; H01L 21/68707
See application file for complete search history.

(56) References Cited

U.S. PATENT DOCUMENTS

| | | | | |
|---|---|---|---|---|
| 6,276,733 | B1 * | 8/2001 | Moilanen | B25J 15/0475 294/116 |
| D521,348 | S * | 5/2006 | Walker | D8/107 |
| 7,735,399 | B2 * | 6/2010 | Robinson | B25G 1/06 81/177.8 |
| 8,191,947 | B2 * | 6/2012 | Jouan De Kervanoael | B25J 13/082 294/106 |
| 2001/0035660 | A1 | 11/2001 | Moilanen et al. | |
| 2010/0095737 | A1 * | 4/2010 | Persson | B25B 7/00 72/409.01 |
| 2010/0156127 | A1 | 6/2010 | De Kervanoael | |

OTHER PUBLICATIONS

Search Report, German Application No. 102014211772.0, Mar. 27, 2015.

* cited by examiner

*Primary Examiner* — Stephen Vu

(74) *Attorney, Agent, or Firm* — Michael Best & Friedrich LLP

(57) ABSTRACT

Pliers which have a first gripper jaw (1) comprising a gripper jaw body (3) and a gripper jaw element (4) that can be moved relative to the gripper jaw body (3), a second gripper jaw (2) comprising a gripper jaw body (3') and a gripper jaw element (4') and a sensor (5). The sensor (5) is disposed on the gripper jaw body (3) such that said sensor can be triggered by the gripper jaw element (4). A contour (6) is formed on the gripper jaw element (4') in a region oriented towards the gripping region of the pliers. A contour (6') is likewise formed on the gripper jaw element (4) in a region oriented towards the gripping region of the pliers. The contours (6, 6') are configured such that, in the closed state of the pliers, the contours (6, 6') are substantially in mesh in a mutually complementary manner.

15 Claims, 3 Drawing Sheets

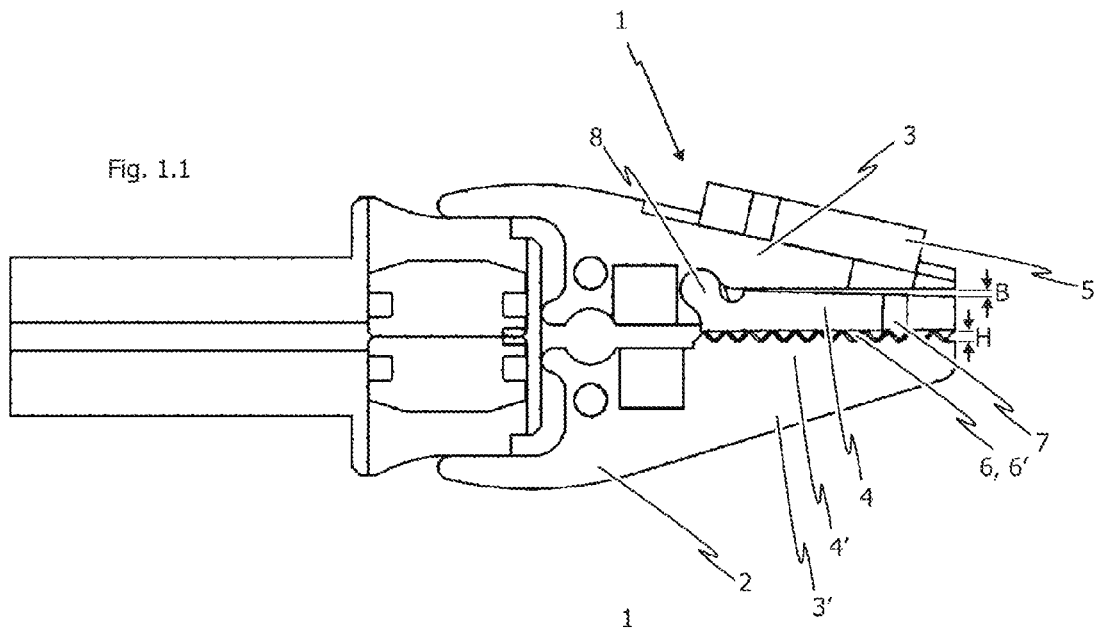
Fig. 1.1
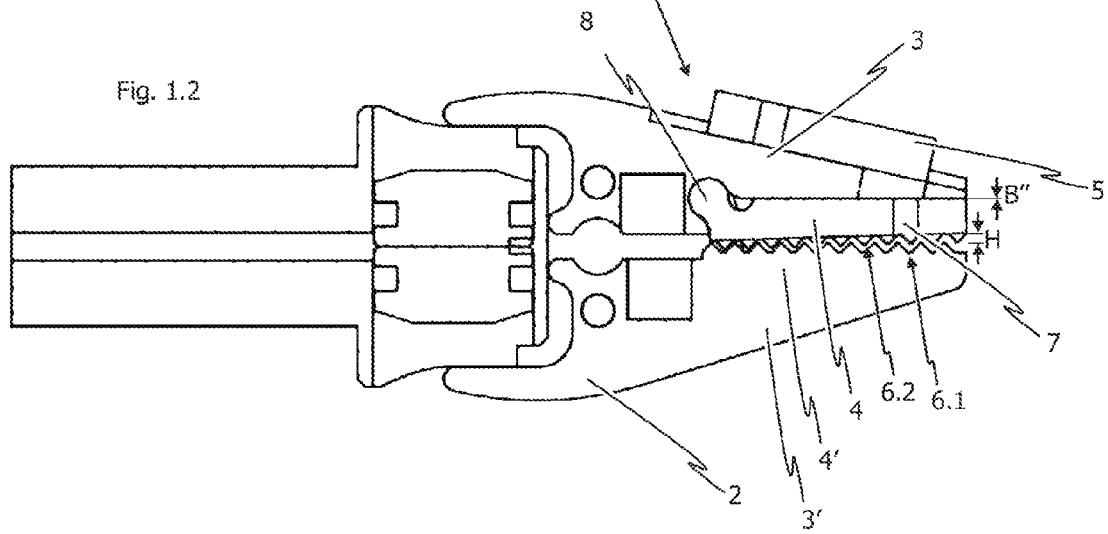
Fig. 1.2

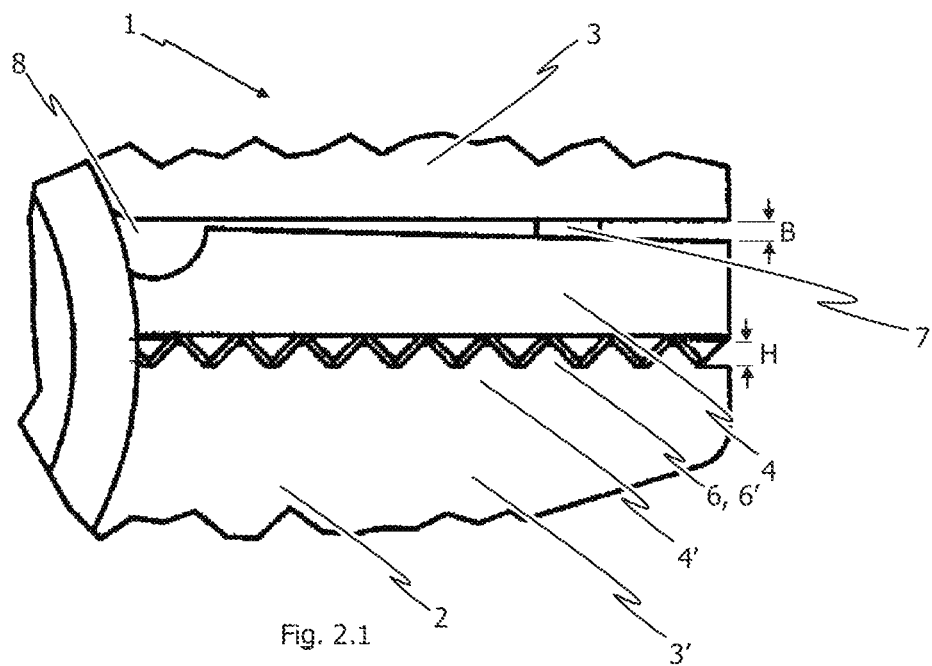
Fig. 2.1
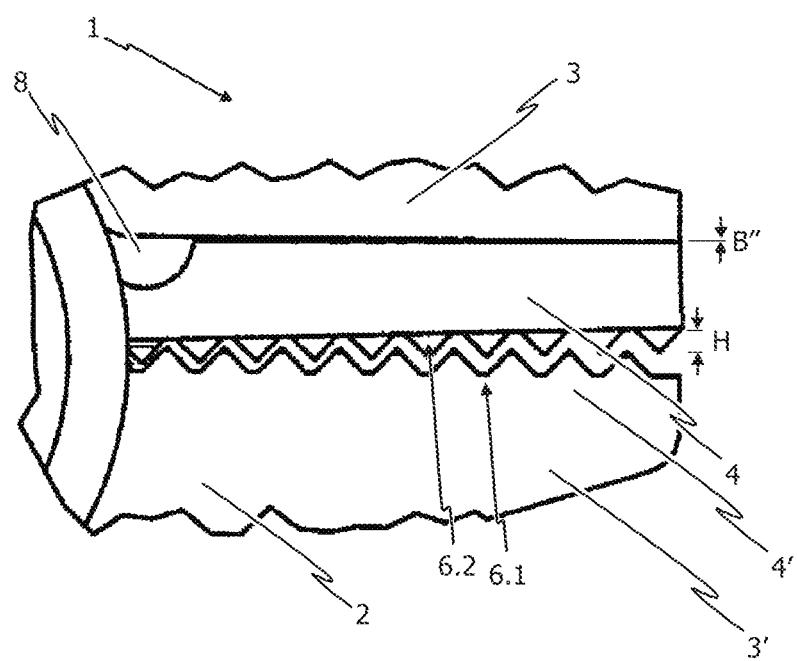
Fig. 2.2

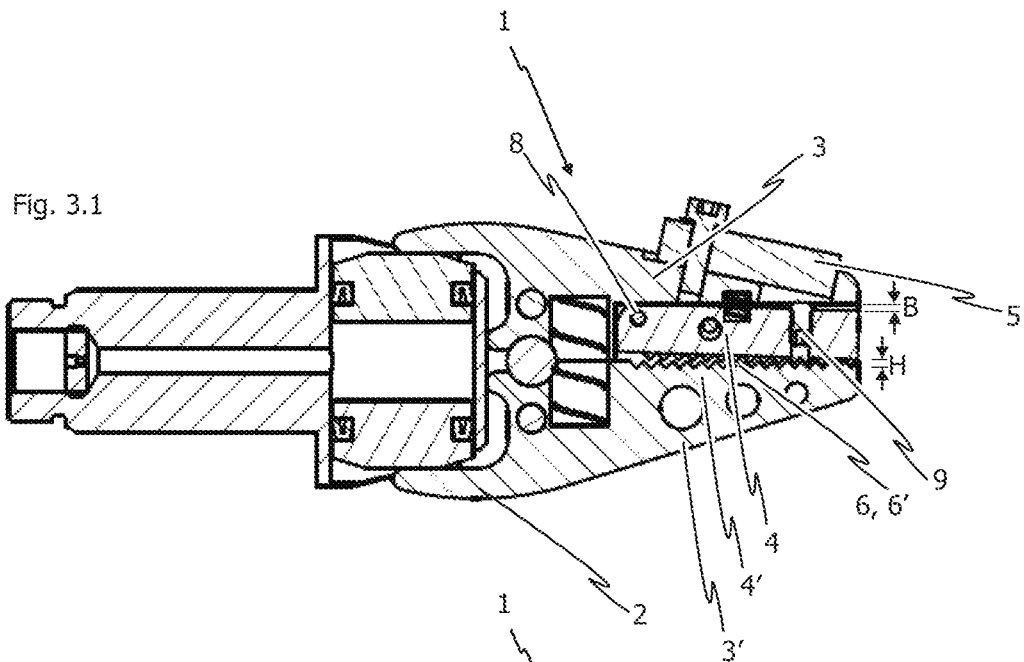
Fig. 3.1
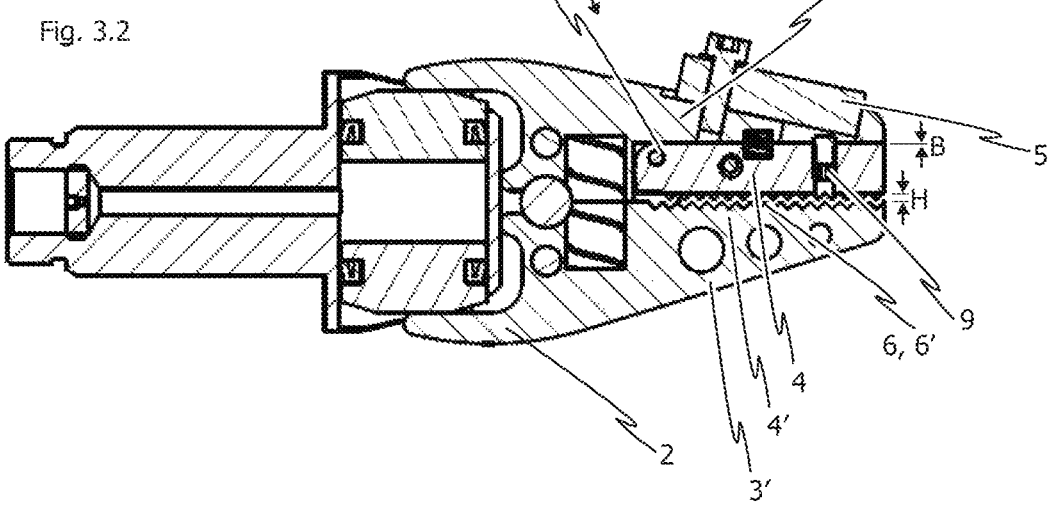
Fig. 3.2

PLIERS

CROSS REFERENCE TO RELATED APPLICATIONS

This application claims priority to German patent document DE102014211772.0 filed Jun. 18, 2014, the entire contents of which are hereby incorporated by reference herein.

BACKGROUND

Gripping pliers are known from the gripping technology which have a first gripper jaw comprising a gripper jaw body and a gripper jaw element that can be moved at least in some regions relative to the gripper jaw body. Such gripping pliers generally have a second gripper jaw which has a gripper jaw body and a gripper jaw element. Such gripping pliers frequently have a sensor which is disposed on the gripper jaw body of the first gripper jaw in such a way that said sensor can be triggered by the gripper jaw element of the first gripper jaw.

Such pliers known from the prior art enable an object to be gripped to be gripped by the pliers and a sensor to be activated by means of the gripping operation. In so doing, it can be detected whether the object to be gripped has been gripped.

The present invention relates to a pair of pliers, in particular gripping pliers.

In gripping technology, it is desirable if a multiplicity of different objects to be gripped can be gripped by such pliers. These objects to be gripped relate to different workpieces, parts, articles, etc. In many applications, it is desirable that thin objects to be gripped, for example thinner than 3 mm, can also be reliably gripped and that this gripping operation can also be detected by means of a sensor. Pliers known up until now require a certain thickness of an object to be gripped in order to grip said object and for said gripping operation to be able to be detected. This limitation reduces the range of application of pliers to date.

On the basis of this definition of the problem, the aim underlying the present invention is to further develop a pair of pliers of the type mentioned above to the extent that thin objects to be gripped can also be gripped and furthermore that this gripping operation can be detected.

A pair of pliers, in particular a gripping pliers, is thus specified according to the invention, said pliers comprising a first gripper jaw. The first gripper jaw comprises a gripper jaw body and a gripper jaw element which can be moved relative to the gripper jaw body at least in some regions. The pliers furthermore have a second gripping jaw comprising a gripper jaw body and a gripper jaw element as well as a sensor. The sensor is disposed adjacent to the gripper jaw body of the first gripper jaw; thus enabling said sensor to be triggered by the gripper jaw element of the first gripper jaw. The gripper jaw element of the second gripper jaw has a contour in a region which faces the gripping region of the pliers. In addition, the gripper jaw element of the first gripper jaw has a contour in a region which likewise faces the gripping region of the pliers. Provision is hereby made for the contour of the gripper jaw element of the first gripper jaw and the contour of the gripper jaw element of the second gripper jaw to be configured, at least in some regions, in such a manner and to be disposed with respect to one another that, in the closed state of the pliers, the contour of the gripper jaw element of the first gripper jaw is in mesh at least in a partially complementary manner with the contour of the gripper jaw element of the second gripper jaw.

The solution according to the invention takes account of the fact that, in the prior art to date, only such objects to be gripped which have a certain thickness can be detected during the gripping operation. This thickness was limited in the prior art to date by the switching backlash of the sensor. For reasons of safety and manufacture, the sensor in pliers to date has a switching backlash which has, in particular, the effect that the gripper jaw element which actuates the sensor has to be spaced apart from said sensor. In the case of pliers known up until now, the gripping of an object can thus only then be detected if the thickness of said object to be gripped is greater than the width of the gap between the gripper jaw element and the sensor. In other words, the gripping of an object can only then be detected if the thickness of the object to be gripped is greater than the switching backlash of the sensor.

In the solutions according to the invention, the contours which touch each other when closing the gripping pliers are configured such that they are in mesh in a mutually complementary manner at least in some regions in order to be able to reliably grip an object to be gripped. As a result, this ensures that objects to be gripped which have an arbitrary thickness can now be gripped and detected.

In many applications, it is desirable for thin objects to be gripped, for example thinner than 3 mm or 4 mm, to be able to be gripped. In addition, the gripping of such an object to be gripped should be able to be detected. Because the solution according to the invention now enables such thin objects to be gripped to be gripped and also to be detected, the range of application of such pliers is enormously expanded. For example, plastic molded components, which have thin tabs for gripping (objects to be gripped), can be gripped on said tabs by means of the pliers according to the invention and be reliably lifted out of corresponding molds for producing plastic components. In such applications, it may be desirable that an object to be gripped has in fact been gripped (detection). Such thin tabs often have a thickness of a few millimeters or even fractions of millimeters.

It is also possible by means of the pliers according to the invention to reliably grip thin films or sheets or the like and also to reliably detect such a gripping operation.

According to one aspect of the present invention, a first sensor gap having a width B, which is determined or can be determined in advance, is formed between the gripper jaw element of the first gripper jaw and the gripper jaw body of the first gripper jaw if the pliers have not gripped anything and said pliers are furthermore in the closed state. In addition, the contour of the second gripper jaw and/or of the gripper element of the first gripper jaw is/are configured in such a manner that the contour, measured from the base of the contour to a raised portion of the contour, has a height H which is determined or can be determined in advance. Provision is made according to the invention for the height H to be greater than or equal to the width B.

The width B corresponds to the distance between the gripper jaw element and the gripper jaw body of the first gripper jaw. Said width thus corresponds substantially to the switching backlash of the sensor. By virtue of the fact that the height H of the contour is selected such that said height H is greater than the width B, it is possible for an object of arbitrary thickness to be gripped by the pliers and for this gripping operation to also be detected by the sensor despite a switching backlash of the sensor or a safety clearance of the gripper element from the gripper jaw body.

In the case of conventional gripping pliers, gripper jaws were designed symmetrically until now due to the existing manufacturing technology. This means, in particular, that the first and second gripper jaws were designed identically to date. In other words, first or upper and second or lower gripper jaws are produced in the same manufacturing process in the case of conventional gripping pliers. As a result, the contourings, for example in the form of gripping teeth, of the gripper jaws are aligned to one another in the assembled state such that the tips of the contours/gripping teeth of the gripper jaws point exactly at each other. In the case of conventional gripping pliers, this means that the gripper jaws can only be closed so far until the tips of the contouring/gripping teeth of the gripper jaws are directly on top of each other. In this state, a sensor gap or, respectively, switching backlash then remains between a gripper jaw element and a sensor. If a thin object to be gripped is now to be gripped and detected, this object to be gripped must have a thickness which is greater than the width of the sensor gap between the gripper jaw element and the sensor or, respectively, the width of the switching backlash of the sensor.

By implementing the contours in a complementary manner as described above on the one hand and by configuring a height H of the contours such that the height H is greater than or equal to the width B of the sensor gap/switching backlash on the other hand, it can be ensured in a synergistic manner that the tips of the contourings are no longer directly on top of each other when the gripping pliers are closed and thus the switching backlash of the sensor no longer limits the thickness, up to which an object to be gripped can be detected.

According to a further aspect of the present invention, the pliers further comprise an adjusting device. The adjusting device is designed in such a way that the width of the first sensor gap can be adjusted.

It is hereby ensured that the width of the first sensor gap does not have to be precisely maintained during the manufacture of the pliers because an adjustment of the width of the first sensor gap can also be carried out, for example by a user, after the manufacture of the pliers.

According to a further aspect of the present invention, the adjusting device is disposed in the region of the gripper jaw body and/or in the region of the gripper jaw element.

As a result, costly constructive changes to the pliers may not be required because the adjusting device is disposed in a simple manner in the region of the gripper jaw body and/or the region of the gripper jaw element, which regions in any case may be required in order to form the pliers.

According to a further aspect of the present invention, the adjusting device is designed as a threaded pin or grub screw.

By providing the adjusting device as a threaded pin or grub screw, a precise adjustment of the width of the first sensor gap can easily be achieved. In particular, a user without special schooling and without special tools can manipulate the adjusting device in order to adjust the width of the sensor gap.

The adjustment of the width of the first sensor gap preferably takes place after the manufacture of the pliers. In a simple manner, the adjustment can be adjusted by eye. It is, of course, also conceivable that the adjustment is automatically carried out, for example, by a measuring and/or adjusting device.

According to a further aspect of the present invention, a second sensor gap, which has a width B that is determined or can be determined in advance, is configured between the gripper jaw element and the gripper jaw body of the first gripper jaw. This sensor gap then exists between the gripper jaw element and the gripper jaw body of the first gripper jaw if the pliers have not gripped anything and are not in a closed state.

The second sensor gap is, for example, greater than the first sensor gap and thereby has the effect that the gripper jaw element of the first gripper jaw is connected to the gripper jaw body of the first gripper jaw according to a design and manufacturing tolerance range.

When closing the pliers, the second sensor gap preferably closes if the first gripper jaw is pressed against the second gripper jaw. The first sensor gap remains unaffected in this case because the first sensor gap is to prevent that a gripping operation is detected although the pliers have not gripped an object to be gripped and are only closed "empty".

In order to ensure that the gripper jaws cannot be closed to such an extent that the gripper jaw element of the first gripper jaw is pressed against the gripper jaw body of the first gripper jaw, and the sensor gap thereby disappears if the pliers are closed and no object to be gripped has been gripped, provision is preferably made for the gripper jaws to lock before the gripper jaw element of the first gripper jaw is pressed against the gripper jaw body of the first gripper jaw. Such a locking of the gripper jaws prevents the first sensor gap from being bridged and the sensor from being triggered.

According to a further aspect of the present invention, the gripper jaw element of the first gripper jaw is pivotably connected to the gripper jaw body of the first gripper jaw, preferably via a connection region.

In so doing, the gripper jaw element can advantageously be spaced apart from the gripper jaw body and the sensor; thus enabling the gripper jaw element to be pressed in the direction of the sensor if an object to be gripped is gripped by the gripping pliers. A safety clearance or a switching backlash of the sensor can thus be maintained (first sensor gap).

According to a further aspect of the present invention, the pliers have a synchronization element. The synchronization element is designed in such a manner that the first gripper jaw and the second gripper jaw can be closed in a self-centering manner in relation to a central longitudinal axis of the pliers. The central longitudinal axis extends laterally midway between the first gripper jaw and the second gripper jaw in the gripping region of the pliers.

This results in the gripper jaws being closed in a self-centering manner when the pliers are closed, and thus a complementary mesh of the contour of the gripper jaw element of the second gripper jaw into the contour of the gripper jaw element of the first gripper jaw is implemented.

Such a synchronization element therefore enables objects to be gripped to not have to be gripped precisely centrally along the central longitudinal axis of the pliers, but said objects can also be gripped in deviation from the central longitudinal axis of the pliers. In this case, force is not exerted symmetrically on such an object to be gripped. It is nevertheless ensured that the gripper jaws are hereby not misaligned with respect to one another, whereby a complementary mesh of the contours in one another would be prevented.

According to a further aspect of the present invention, the synchronization element has a circularly cylindrical part which is disposed along a longitudinal axis parallel to the axes of rotation of the gripper jaws.

Such a circularly cylindrical part consequently enables the gripper jaws to be closed symmetrically with respect to the central longitudinal axis of the pliers. This particularly means that the contours of the pliers, i.e. the contour of the gripper jaw element of the second gripper jaw and the contour of the gripper jaw element of the first gripper jaw come into contact with each other precisely in the region of the central longitudinal axis.

The circularly cylindrical part is preferably disposed such that it perpendicularly intersects the central longitudinal axis of the pliers. As a result, a self-centering can be achieved, and a compact design of the pliers can be implemented at the same time.

According to a further aspect of the present invention, the contour of the gripper jaw element of the second gripper jaw and/or the contour of the gripper jaw element of the first gripper jaw is/are at least in some regions designed conically, tetrahedron-shaped or pyramidally.

In an advantageous manner, the contouring can be correspondingly selected such that an object to be gripped can be especially well gripped. Depending on the object to be gripped, a conical, tetrahedron-shaped or pyramidal design of the contour is particularly advantageous.

According to a further aspect of the present invention, the contour of the gripper jaw element of the second gripper jaw and/or the contour of the gripper element of the first gripper jaw is/are at least in some regions designed in an elongated fashion, in particular edge-shaped, flute-shaped, notch-shaped or groove-shaped.

The design of the contouring is advantageously adapted to the object to be gripped in order to thereby achieve an optimal adherence between the gripper jaw element of the second gripper jaw and the object to be gripped or, respectively, between the gripper jaw element of the first gripper jaw and the object to be gripped.

According to a further aspect of the present invention, the gripper jaw element of the first gripper jaw has a metallic, preferably magnetic or magnetizable region. The sensor emits a signal, preferably an electrical signal, if the metallic region of the gripper jaw element of the first gripper jaw touches the sensor or falls below a certain predetermined or predeterminable distance to the sensor.

As a result, it can be advantageously detected that an object to be gripped has been gripped if the gripper jaw element of the first gripper jaw and the gripper jaw element of the second gripper jaw touch the object to be gripped, and the gripper jaw element of the first gripper jaw is pressed towards the gripper jaw body of the first gripper jaw and thus towards the sensor by the gripper jaws being pressed together.

The metallic region is designed in this case such that said region precisely touches the sensor if the gripper jaw element touches the sensor or comes to rest on the gripper jaw body of the first gripper jaw. On the other hand, it is, of course, conceivable that the gripper jaw element has not yet come in contact with the sensor or the gripper jaw body of the first gripper jaw if the metallic region has already come into contact with the sensor. It is also conceivable that the sensor then emits a signal (detection) if the metallic region of the gripper jaw element of the first gripper jaw comes near the sensor.

The sensor is hereby preferably designed to be operated in a binary mode. This means that the sensor does not send out a signal as long as said sensor is not in contact with the metallic region, and sends out a signal if it is in contact with the metallic region. It can thus be ensured that the sensor is only then triggered if an object to be gripped has been gripped. A proximity sensor, preferably an inductive proximity sensor, is however also conceivable.

According to a further aspect of the present invention, a control unit is associated with the pliers. The control unit is designed to detect a gripping operation of the pliers if a signal is transmitted from the sensor to the control unit. To this end, the sensor is preferably connected to the control unit. The control unit is preferably designed to uniformly maintain the force which is exerted by the gripper jaws, if it has been detected that the pliers have gripped something.

As a result, it can be advantageously ensured that, for the further processing or the further operation of the pliers, it has been detected whether an object to be gripped has been gripped. In addition, it can be ensured that the object to be gripped is not damaged by the gripping pliers.

BRIEF DESCRIPTION OF THE DRAWINGS

The invention is described below in detail with reference to the attached drawings on the basis of exemplary embodiments of the pliers according to the invention.

In the drawings:

FIG. 1.1: shows a schematic depiction of the pliers according to the invention in the completely closed state;

FIG. 1.2: shows a schematic depiction of pliers according to the invention in the (slightly) open state;

FIG. 2.1: shows an enlarged depiction of a partial region of the inventive pliers from FIG. 1.1 (closed state); and FIG. 2.2: shows an enlarged depiction of a partial region of the inventive pliers from FIG. 1.2 (slightly open state);

FIG. 3.1: shows an adjusting device; and

FIG. 3.2: further shows the adjusting device.

DETAILED DESCRIPTION

Exemplary embodiments of the pliers according to the invention are described below with reference to the depictions in the FIGS. 1.1 to 3.2.

In FIG. 1.1, a gripping pliers is depicted, wherein the gripping pliers has a first gripper jaw 1 as well as a second gripper jaw 2. The first gripper jaw 1 is exemplarily arranged here above the second gripper jaw 2. It is, of course, also conceivable that the first gripper jaw 1 is arranged below the second gripper jaw 2. The gripper jaws 1, 2 can be opened and closed by a suitable mechanism.

Such a mechanism can, for example, be a pneumatically, hydraulically or mechanically actuated mechanism. Provision is hereby made for the gripper jaws 1, 2 of the gripping pliers to be able to be opened and/or closed by means of the mechanism.

Provision is preferably made for the gripper jaws to be able to be closed only to the extent that the gripper jaws are not completely pressed together. In other words, it is conceivable that the gripper jaws are blocked shortly before being completely pressed together.

The first gripper jaw 1 has a gripper jaw body 3 which can be moved by means of a force described above (opening or, respectively, closing of the gripper jaw). A gripper jaw element 4 is disposed adjacently to the gripper jaw body 3, wherein the gripper jaw element 4 is preferably pivotably connected via a receiving region 8 to the gripper jaw body 3.

As is shown in FIG. 1, the gripper jaws 1, 2 can be closed to such an extent that the gripper jaw element 4 just touches or almost touches the second gripper jaw 2.

Provision is hereby made for a first sensor gap of the width B to exist between the gripper jaw element 4 and the gripper jaw body 3. The width B is defined or can be defined and corresponds substantially to the switching backlash of a sensor 5.

The width B of the first sensor gap can preferably be set by an adjusting device 9. The adjusting device 9 is shown, by way of example, in FIGS. 3.1 and 3.2 and is disposed in the region of the gripper jaw element 4. The adjusting device 9 can also be disposed in the region of the gripper jaw body 3. The adjusting device 9 can be embodied as a threaded pin or grub screw, whereby the width B of the first sensor gap can be precisely adjusted mechanically.

Using a common tool, for example a typical hex driver that can be inserted into the threaded pin, a user can adjust here the width B of the first sensor gap by the threaded pin being unscrewed from the gripper jaw element 4 in the direction of the first sensor gap or being screwed in in the direction of the gripper jaw element 4.

The sensor 5 is disposed on the gripper jaw body 3. By way of example, the sensor 5 is depicted above the gripper jaw body 3 in the depiction of FIG. 1. It is, of course, also conceivable that the sensor 5 is disposed laterally on the gripper jaw 1 or in another suitable manner on the gripper jaw 1 or on the gripper body 3.

In a state which is depicted in FIG. 1 and in which the gripping pliers is closed, the sensor gap of the width B remains between the gripper jaw element 4 and the gripper jaw body 3 or, respectively, the sensor 5. The sensor 5 can thereby protrude into the gripper jaw body 3, as depicted in FIG. 1, so that the distance B results between the gripper jaw element 4 and the sensor 5. Provision is hereby preferably made for the gripper jaw element 4 to have a metallic region 7 which, in the closed state of the gripping pliers, is spaced apart from the sensor 5 substantially by the distance B.

If, as depicted in FIG. 1.2, an object to be gripped which is very thin is gripped, the gripper jaw element 4 is pressed upwards against the gripper jaw body 3 or, respectively, the sensor 5. In FIG. 1.2, the case is shown, wherein a very thin object to be gripped has been gripped. As depicted in the FIGS. 2.1 and 2.2, the metallic region 7 can also be designed in a pin-shaped manner; thus enabling the metallic region 7 to extend through the gripper jaw body 3 in the direction of the sensor 5. If, as depicted in FIG. 2.2, a thin object to be gripped has been gripped, the metallic region 7 preferably comes in contact with the sensor 5. On the other hand, the sensor 5 can also be designed such that said sensor 5 generates a signal if the metallic region 7 falls below a predetermined or predeterminable distance to the sensor 5. To this end, an inductive coupling between the sensor 5 and the metallic region 7 is conceivable.

Provision is made according to the invention for a contour 6, 6' to be provided respectively on the gripper jaw element 4 as well as on the gripper jaw element 4' of the second gripper jaw 2. The contour 6, 6' preferably has the shape of gripping teeth. The contour 6, 6' can, however, also be designed conically, tetrahedron-shaped or pyramidally or also in an elongated fashion, in particular edge-shaped, flute-shaped, notch-shaped or groove-shaped.

Provision is made according to the invention for the contour 6 of the gripper element 4 to be designed, at least in some regions, complementary to the contour 6' of the gripper jaw element 4' of the second gripper jaw 2. A base region 6.1 of the contour, for example of the gripper jaw element 4'of the second gripper jaw 2, can therefore be designed such that the tip 6.2 of a contour 6, for example of the gripper element 4, fits, at least in some regions, precisely into the base region 6.1 of the contour 6', for example of the gripper jaw element 4' of the second gripper jaw. The contours 6, 6' are in mesh with each other if the pliers are closed.

In other words, the region of the contouring/of the gripping teeth 6.1 of a gripper jaw 1, 2 is designed complementary to the region of the contouring/of the gripping teeth 6.2 of the other gripper jaw 1, 2 or, respectively, of the gripper element 4, 4'.

Provision is additionally made synergistically to this characteristic offset of the gripping teeth 6, 6' for the gripping teeth/the contouring 6, 6' of the gripper jaw elements 4, 4' to have a certain predetermined or predeterminable height H. This height H corresponds to the distance from a base 6.1 of at least one element of the contouring/of a gripping tooth 6, 6' to the point of the raised portion/of the tip 6.2 of this part of the contouring/of this gripping tooth 6, 6'. In other words, a first plane is defined by the base 6.1 of the contouring/of the gripping teeth 6, 6', and a second plane is defined by the tip(s) 6.2 of the contourings/of the gripping teeth 6, 6', wherein the distance between the two planes is H.

The complementary design of the contours 6, 6' as well as the provision of a height H of the contours 6, 6' ensures that, in the closed state of the gripping pliers, the gripper jaw element 4 is spaced apart from the sensor 5 or, respectively, the gripper jaw body 3 by a gap of the width B, wherein the contour 6 of the gripper jaw element 4 and the contour 6 of the gripper jaw element 4' mesh with each other in this case. If a thin object is now to be gripped, the gripper jaws 1, 2 or, respectively, the gripper jaw elements 4, 4' must be moved apart (FIGS. 1.2 and 2.2), wherein, in this case in contrast to gripping pliers known to date, the height H is additionally available before the gripper jaws 1, 2 have to opened further. An opening action, as may be required with gripping pliers known to date, makes sure that an object to be gripped can only be detected by the sensor 5 if the object to be gripped has a certain thickness. This thickness must be greater than the gap width B or, respectively, the switching backlash B. In contrast in the case of the gripping pliers, the height H is additionally "gained". This means that an object to be gripped of the theoretical thickness of 0 mm can then not be detected if the sensor gap width B or, respectively, the switching backlash B is greater than the height H. According to the invention, provision is, however, made for the height H to be greater than or equal to the gap width B. Hence, even objects to be gripped of the thickness 0 mm can theoretically be gripped and this gripping action can also be detected.

The gripper jaw element 4 can be pivotably connected via a receiving region 8 to the gripper jaw body 3. This makes sure that, in a state in which the gripping pliers have not gripped an object to be gripped, the sensor 5 is not triggered by the metallic region 7 of the gripper jaw element 4 and therefore does not emit a signal which would mean that an object to be gripped has been gripped by the gripping pliers. The gripper jaw element 4 is connected to the gripper jaw body 3 by means of the receiving area 8 such that at most the sensor gap of the width B develops between the gripper jaw body 3 and the gripper jaw element 4 if the pliers are closed and have not gripped anything.

The gripping pliers can have a synchronization element (not shown), which is designed to ensure a synchronous closing of the gripper jaws with respect to a central longitudinal axis of the gripping pliers. Such a symmetrical closing of the gripper jaws 1, 2 is advantageous in order to ensure a complementary mesh of the contours 6, 6' of the gripper jaw elements 4, 4'. Such a synchronization element has the effect that the gripper jaws 1, 2 are closed in a self-centering manner, which means that the gripper jaws 1, 2 do not have to be actively actuated in order to facilitate such a symmetrical closing but are advantageously automatically closed symmetrically with respect to one another.

Such a synchronization element can, for example, have a circularly cylindrical part, wherein the circularly cylindrical part is disposed in such a manner that said circularly cylindrical part extends along a longitudinal axis parallel to the axes of rotation of the gripper jaws. In this case, the circularly cylindrical part preferably connects the gripper jaws 1, 2 such that both gripper jaws 1, 2 can only be moved symmetrically in relation to said circularly cylindrical part, in order, in so doing, to facilitate a symmetrical (self-centering) closing of the gripper jaws 1, 2.

The signal, which is generated by the sensor 5 if the sensor 5 comes in contact with the metallic region 7 of the gripper jaw element of the first gripper jaw 1 or if the metallic region 7 falls below a predetermined or predeterminable distance to the sensor 5, can preferably be supplied to a control unit (not shown). The control unit thus receives from the sensor 5 either the signal that no object to be gripped has been gripped or that an object to be gripped has been gripped. The transmission of the signal from the sensor 5 to the control unit preferably takes place by means of a cable, can, however, also take place in a wireless manner. The control unit is preferably designed such that said control unit controls the force which is exerted by the gripper jaws 1, 2. This control can take place such that the force is adapted to the object to be gripped. If the sensor 5 sends a signal to the control unit after an object to be gripped has been gripped, the control unit can preferably bring about the situation that the object to be gripped is only gripped with a predetermined force in order not to damage the object to be gripped and at the same time to reliably hold the same.

In the case of thin objects to be gripped, such as, e.g., films, it may be critical from a manufacturing viewpoint that a gripping operation of the film, respectively the thin object, to be gripped by the gripping pliers can be reliably detected. This is particularly important because otherwise the danger exists that the gripping pliers do not grip the object to be gripped or else that the object to be gripped is damaged during the gripping operation.

The invention is not limited to the embodiments of the inventive pliers depicted in the drawings but is revealed by an overall view of all of the features disclosed herein.

LIST OF REFERENCE SIGNS

1 first gripper jaw
2 second gripper jaw
3, 3' gripper jaw body
4, 4' gripper jaw element
5 sensor
6 contours
6.1 base of the contour(s)
6.2 tip of the contour(s)
7 metallic region
8 receiving region
B width (of the sensor gap in the closed state)
B' width (of the sensor gap in the open state)
B" width (of the sensor gap, if the plier have gripped something)
H height (of the contour)

The invention claimed is:

1. Pliers comprising:
a first gripper jaw (1) comprising a first gripper jaw body (3) and a gripper jaw element (4) that can be moved relative to the first gripper jaw body (3) in at least in some regions of the gripper jaw body (3);
a second gripper jaw (2) comprising a second gripper jaw body (3') and a second gripper jaw element (4') ; and
a sensor (5), which is disposed on the gripper jaw body (3) of the first gripper jaw (1) such that said sensor can be triggered by the gripper jaw element (4) of the first gripper jaw (1),
wherein a contour (6) is formed on the gripper jaw element (4') of the second gripper jaw (2) in a region which is oriented towards a gripping region of the pliers, and a contour (6') is formed on the gripper jaw element (4) of the first gripper jaw (1) in a region which is oriented towards the gripping region of the pliers, and
wherein the contour (6) of the gripper jaw element (4') of the first gripper jaw (1) and the contour (6') of the gripper jaw element (4') of the second gripper jaw (2) are configured in such a manner and disposed with respect to one another that, in a closed state of the pliers, the contours (6, 6') are at least in part substantially in mesh in a mutually complementary manner.

2. The pliers according to claim 1, wherein a first sensor gap having a width (B) is formed between the gripper jaw element (4) of the first gripper jaw (1) and the gripper jaw body (3) of the first gripper jaw (1) if the pliers have not gripped anything and are in the closed state, and
wherein the contour (6, 6') of the gripper jaw element (4') of the second gripper jaw (2) and/or of the gripper jaw element (4) of the first gripper jaw (1) is designed in such a manner that the contour (6, 6'), measured from a base (6.1) of the contour (6, 6') to a raised portion (6.2) of the contour (6, 6'), has a height H that is greater than or equal to the width (B).

3. The pliers according to claim 1, wherein the pliers have an adjusting device (9) which is configured such that the width (B) of the first sensor gap can be adjusted.

4. The pliers according to claim 3, wherein the adjusting device (9) is disposed in the region of the gripper jaw body (3) and/or in the region of the gripper jaw element (4).

5. The pliers according to claim 4, wherein the adjusting device (9) includes a threaded pin or grub screw.

6. The pliers according to claim 1, wherein a second sensor gap having a width (B) is formed between the gripper jaw element (4) of the first gripper jaw (1) and the gripper jaw body (3) of the first gripper jaw (1) if the pliers have not gripped anything and are not in a closed state.

7. The pliers according to claim 6, wherein the width (B) corresponds substantially to a switching backlash of the sensor 5.

8. The pliers according to claim 1, wherein the gripper jaw element (4) of the first gripper jaw (1) is pivotably connected to the gripper jaw body (3) of the first gripper jaw (1).

9. The pliers according to claim 1, wherein the contour (6') of the gripper jaw element (4') of the second gripper jaw (2) and/or the contour (6) of the gripper jaw element (4) of the first gripper jaw (1) is/are designed conically, tetrahedron-shaped or pyramidally at least in some regions.

10. The pliers according to claim 1, wherein at least one of the contour (6') of the gripper jaw element (4') of the second gripper jaw (2) and the contour (6) of the gripper jaw element (4) of the first gripper jaw (1) are elongated in at least in some regions.

11. The pliers according to claim 10, wherein the at least one of the contour (6') of the gripper jaw element (4') of the second gripper jaw (2) and the contour (6) of the gripper jaw element (4) of the first gripper jaw (1) are one of edge-shaped, flute shaped, notch shaped, and groove shaped.

12. The pliers according to claim 1, wherein the gripper jaw element (4) of the first gripper jaw (1) has a metallic region (7) and wherein the sensor (5) is designed to emit a signal if the metallic region (7) of the gripper jaw element (4) of the first gripper jaw (1) touches the sensor (5) or falls within a certain predetermined distance to the sensor (5).

13. The pliers according to claim 12, wherein the sensor (5) is configured to transmit a signal relaying a gripping operation of the pliers.

14. The pliers according to claim 1, wherein the gripper jaw element (4) of the first gripper jaw (1) has a magnetic region (7), and wherein the sensor (5) is designed to emit a signal if the magnetic region (7) of the gripper jaw element (4) of the first gripper jaw (1) touches the sensor (5) or falls within a certain predetermined distance to the sensor (5).

15. The pliers according to claim 1, wherein the gripper jaw element (4) of the first gripper jaw (1) has a magnetizable region (7), and wherein the sensor (5) is designed to emit a signal if the magnetizable region (7) of the gripper jaw element (4) of the first gripper jaw (1) touches the sensor (5) or falls within a certain predetermined distance to the sensor (5).

* * * * *